Patented Aug. 15, 1933

1,922,693

UNITED STATES PATENT OFFICE 1,922,693

EXTRACTING IODINE FROM NATURAL WATERS AND THE LIKE

Leonard C. Chamberlain, Midland, Mich., assignor to The Dow Chemical Company, Midland, Mich., a Corporation of Michigan No Drawing. Application March 2, 1931
Serial No. 519,696

2 Claims. (Cl. 23—217)

This invention relates to methods for the extraction and recovery of iodine from solutions or natural brines and the like containing the same in combined form as iodide. It has particular regard to methods wherein such iodine is liberated in the free state in the solution, removed therefrom by adsorption upon a suitable adsorbent material, and finally recovered by treatment of the iodine-containing adsorbent material.

It is known that iodine, when present in the elemental state in an aqueous medium, may be separated therefrom by contacting the solution with an adsorbent material such as active charcoal. Difficulties arise, however, in recovering the iodine from the charcoal. Chemical methods, such as treating with aqueous caustic alkali or carbonate solutions, or with solutions of reducing agents, for example either basic or acid sulphite solutions, have resulted in only an imperfect recovery, often not materially greater than from 50 to 60 per cent of the total iodine in the charcoal. Considerable irregularity is shown by different charcoals, or different lots of the same kind of charcoal, when they are treated with solutions of chemical reagents for removing adsorbed iodine therefrom, the percentage of total iodine recoverable thereby fluctuating greatly, oftentimes erratically. At best, repeated washing of the treated charcoal is necessary to dissolve out the iodine compounds, thus diluting the solution obtained with a relatively large volume of wash water which must be evaporated in order to concentrate the solution sufficiently to crystallize out the dissolved salts. Furthermore, the iodine so recovered is in combined, and not elemental, form, and the salts obtained directly are not pure, being mixed with reagent used, so that further purification is required to prepare a marketable product.

It has also been proposed to drive off the iodine from iodine-charged charcoal by heating to a high temperature, e. g. 500° C. or even to incandescence, in a current of a gas nonreactive with the iodine, such as carbon dioxide, and then to separate the iodine from the gases, according to the method disclosed in U. S. Patent 1,438,071. There are material disadvantages attaching to such mode of procedure, however, especially when it is desired to recover the volatilized iodine directly in the elemental form, owing to the great difficulty of condensing the vapor quantitatively when diluted by a large volume of permanent gases. The temperature at which the heating is carried out is also destructive of the charcoal, which is a relatively expensive material and in a commercial process must be preserved from loss or injury as far as possible so as to be used repeatedly.

I have now found that the recovery of iodine is greatly simplified if the heating of the iodine-charged charcoal is carried out in a current of a readily condensable vapor, specifically steam. A further advantage of such improved procedure is that a materially lower temperature, e. g. between 200° and 300° C., may be employed, whereby loss of, or damage to, the charcoal is substantially avoided. The invention, then, consists in the improved procedure hereinafter fully described and particularly pointed out in the claims, the following description setting forth in detail but a few of the various ways in which the principle of the invention may be used.

A feature of my improved method or process is that, in a current of water vapor or steam, moderately elevated temperatures suffice for the volatilization of the adsorbed iodine held by the charcoal, as contrasted with the high temperatures found necessary when employing a permanent gas such as carbon dioxide. In fact, over 50 per cent of the iodine may be removed from charcoal saturated therewith by treating with a current of steam at a temperature as low as 100° to 120° C., and then by increasing the temperature of the steam to between 200° and 300° C. the total extraction may be increased to more than 90 per cent. The charcoal containing the small residue of unrecovered iodine may then be used over again repeatedly to adsorb further quantities thereof so that under continuous operation there is no material loss of iodine in the charcoal. Incidentally thereto, the steaming-out operation removes volatile impurities, such as oil, which often are taken up by contact with a crude brine containing such impurities, and leaves the charcoal in a highly reactive state. Thus little or no diminution of activity or deterioration of the charcoal occurs, even after long use. The iodine vapors removed by the steam are readily condensed along with the water vapor and may be separated from the aqueous condensate by filtering.

The present improvements, as already stated, are more particularly concerned with the extraction of iodine from natural waters wherein such iodine is contained in exceedingly small amount accompanying a much higher concentration of chlorides or other salts. For example, I have applied the method for extracting iodine from a natural brine having a composition represented approximately by the following analysis:

|  | Per cent |
|---|---|
| Specific gravity | 1.036 |
| NaCl | 4.87 |
| $MgCl_2$ | 0.41 |
| $CaCl_2$ | 0.26 |
| Fe | 0.0088 |
| $Br_2$ | 0.0208 |
| $I_2$ | 0.0045 |
| Alkalinity—approx | 0.012N |

The brine is first acidified with a strong mineral acid, e. g. sulphuric acid, approximately to a hydrogen ion concentration expressed as $p_H=3$. With the particular brine in question at least such degree of acidification is required in order to secure a complete liberation of iodine in the following step. The acid solution is treated with chlorine in amount equivalent to the iodine present, thereby liberating the iodine in the free state.

The chlorinated solution containing free iodine dissolved therein is then contacted in any suitable way with a body of active charcoal. Any desired form of active charcoal may be used, but I have found cocoanut charcoal to be well adapted for the purpose. Various ways of contacting the solution containing free iodine with the charcoal may be used. For example the charcoal may be maintained in suspension in the body of solution under treatment by agitation until adsorption of the iodine is complete. More conveniently the solution may be caused to flow either upwardly or downwardly through a tank or tower containing a body of the charcoal, the rate of flow being regulated to obtain complete adsorption of iodine during passage through the column. Modifications of the foregoing will be apparent to those versed in the art, which may be employed if desired. When using cocoanut charcoal I have found that the same will adsorb approximately nine-tenths of its weight of iodine. For treating a solution containing approximately 50 parts per million of iodine I have found that 6 grams of cocoanut charcoal of 6 to 20 mesh fineness will adsorb substantially all of the iodine from 1 liter in 1 hour. In large scale operation a 300 pound charge of dry cocoanut charcoal will suffice for 24 hours to treat a brine containing 45 parts per million of free iodine at a rate of flow of 80 gallons per minute.

The iodine-saturated charcoal is separated from the solution by draining, decanting or filtering and then subjected to the action of steam, preferably superheated to a temperature of 200° to 300° C., whereby over 90 per cent of the iodine may be volatilized and removed. The operation may be carried out by passing a current of superheated steam through the body of charcoal in any way to secure intimate contact. When the adsorption of iodine by the charcoal is carried out by flowing the iodine-containing solution through a column filled with the charcoal, the steaming-out operation may be effected subsequently in the same column without disturbing the body of charcoal. The exit vapors from the steaming-out operation are cooled and finally condensed, whereby the iodine is deposited in solid form which is easily separated from the aqueous condensate and dried, being thus recovered directly in a highly pure state. The charcoal, after steaming out, may then be used for adsorbing iodine from a further quantity of chlorinated brine, and the above procedure repeated.

Since as much as 50 per cent of the iodine adsorbed on the charcoal may be steamed out at a temperature of 100° C. or slightly higher, and at about normal atmospheric pressure, the steaming-out operation may be carried out in two stages, using steam at about 100° to 200° C. in the first stage to remove a portion of the iodine, and completing the operation in the second stage with steam at 200° to 300° C. When operating in two stages, as aforesaid, the consumption of steam will be somewhat greater, but only a portion thereof will require to be superheated to the higher temperature. In experiments I have found that the steam consumption, using steam at 200° C., is about 100 pounds per pound of iodine recovered, whereas when operating in two stages at 120° and 200° C., respectively, a total of about 125 pounds steam per pound iodine was used, nearly equally divided between the lower and higher temperature steam. The actual steam consumption will vary considerably, however, depending upon the size and design of apparatus, manner of control, and other factors. In large scale operations the tendency is toward a materially lower steam consumption than that above stated.

The use of superheated steam is especially advantageous, not only in that it enables a materially higher degree of extraction of iodine from the charcoal at a lower temperature than by other methods employing heat, but also because it leaves the charcoal in a highly reactive condition for repeated use in adsorbing further quantities of iodine. The charcoal is not subjected to mechanical loss by attrition or crumbling, nor is it contaminated by the absorption of salts or other substances that act to reduce its adsorbing capacity, such as result from treatment with solutions of chemical reagents. Losses by partial oxidation, which accompany heating at high temperatures in the presence of oxidizing gases, such as air or carbon dioxide, are entirely avoided. The complete separation and recovery of vaporized iodine is easily accomplished by simple means when employing a readily condensable vapor such as steam for the vaporizing medium. The separated iodine is recovered as such either by condensing in solid form in a part of the apparatus maintained at a temperature slightly above 100° C., or by filtering the solid material from the aqueous condensate.

For purposes of the present invention any form of activated carbon capable of adsorbing iodine may be employed as a substantial equivalent of charcoal and in the claims the term "active charcoal" is understood to include such equivalent forms of activated carbon, whether prepared from wood or shell chars, from coal, or in any other way.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of extracting iodine adsorbed upon active carbon or charcoal, the steps which consist in subjecting the iodine-charged charcoal to the action of steam at a temperature between 100° and 200° C., whereby a portion of the iodine is vaporized therefrom, then subjecting to the action of superheated steam at a temperature between 200° and 300° C. to vaporize a further portion of the iodine, cooling and condensing the vapors and separating iodine from the aqueous condensate.

2. The method of producing iodine from natural iodiferous brines and the like which comprises liberating the iodine in the brine, removing the free iodine from the brine by contacting the latter with active charcoal, separating the iodine-charged charcoal from the brine, subjecting such charcoal to the action of steam at a temperature between 100° and about 200° C. to vaporize a portion of the iodine therefrom, then subjecting to the action of steam superheated to a temperature between about 200° and about 300° C. to vaporize a further portion of the iodine, cooling and condensing the vapors and separating iodine therefrom.

LEONARD C. CHAMBERLAIN.